(12) United States Patent
Chang

(10) Patent No.: US 8,976,217 B2
(45) Date of Patent: Mar. 10, 2015

(54) INTEGRATED MODULE FOR WIRELESS NETWORK AND VIDEOCONFERENCE

(71) Applicant: Nai-Chien Chang, New Taipei (TW)

(72) Inventor: Nai-Chien Chang, New Taipei (TW)

( * ) Notice: Subject to any disclaimer, the term of this patent is extended or adjusted under 35 U.S.C. 154(b) by 139 days.

(21) Appl. No.: 13/758,368

(22) Filed: Feb. 4, 2013

(65) Prior Publication Data

US 2013/0201278 A1    Aug. 8, 2013

(30) Foreign Application Priority Data

Feb. 7, 2012   (TW) .............................. 101202231 A

(51) Int. Cl.
*H04N 7/14* (2006.01)
*H04N 7/15* (2006.01)
*G06F 1/16* (2006.01)
*H04L 12/18* (2006.01)

(52) U.S. Cl.
CPC ................ *H04N 7/15* (2013.01); *G06F 1/1686* (2013.01); *H04L 12/1813* (2013.01)
USPC ...................................... 348/14.01; 358/1.14

(58) Field of Classification Search
None
See application file for complete search history.

(56) References Cited

U.S. PATENT DOCUMENTS

2002/0039194 A1*   4/2002   Nakao et al. .................. 358/1.14
2012/0026709 A1*   2/2012   Chuang ......................... 361/803

* cited by examiner

*Primary Examiner* — Maria El-Zoobi
(74) *Attorney, Agent, or Firm* — Muncy, Geissler, Olds & Lowe, P.C.

(57) ABSTRACT

A wireless network and videoconference includes a circuit board, a wireless local area network (WLAN) interface, a videoconference interface, and a transmission interface. The WALN interface is placed on the circuit board and electrically connected thereto. The videoconference interface is placed on the circuit board and electrically connected thereto. The transmission interface is electrically connected to the WLAN interface, the videoconference interface, and a mother board.

10 Claims, 5 Drawing Sheets

INTEGRATED MODULE FOR WIRELESS NETWORK AND VIDEOCONFERENCE

This application is based on and claims priority from Taiwan Application No. 101202231, filed Feb. 7, 2012, the disclosure of which is hereby incorporated by reference herein in its entirety.

BACKGROUND OF THE INVENTION

1. Field of the Invention

The present invention relates to an integrated module for wireless network and videoconference, and in particular to a module integrated wireless local area network (WLAN) interface and image-reading device of videoconference.

2. Description of Related Art

Laptop is a compact and convenient personal computer with ease of carrying.

Currently laptop (as shown in FIG. 1) includes a host body 10a and a foldable display 20a pivoted on the host body 10a. A videoconference lens 22a is assembled within a frame 21a and located above the display 20a. A transmitting interface of the videoconference lens 22a is electrically connected to a mother board 11a of the main host 10a via a bus 24a (or conductive wire). An antenna 23a for receiving or emitting signals of a wireless network is assembled within a lateral side of the frame 21a. The antenna 23a is connected to the mother board 11a via a transmitting wire 25a, such that the signals received and emitted by the antenna 23a are directly transmitted to a wireless network chip 12a placed on the mother board 11a and processed by the wireless network chip 12a.

Using videoconference and internet access can narrow the distance between people, however the videoconference lens 22a, the antenna 23a are respectively assembled within the frame 21a the display 20a. The wireless network chip 12a is placed on the mother board 11a and electrically connecter thereto. The videoconference lens 22a and the antenna 23a are electrically connected to the mother board 11a via bus 24a and transmitting wire 25a, respectively. Therefore, the manufacturing time and labor are increased.

SUMMARY OF THE INVENTION

It is an object to provide an integrated module for wireless network and videoconference.

Accordingly, the integrated module for wireless network and videoconference according to one aspect of the present invention is assembled on a laptop and electrically connected to a mother board of the laptop. The integrated module for wireless network and videoconference comprises a circuit board, a wireless local area network (WLAN) interface, a videoconference interface, and at least one transmitting interface. The WLAN interface is placed on the circuit board and electrically connected thereto. The videoconference is placed on the circuit board and electrically connected thereto. The transmitting interface is electrically connected to the WLAN interface, the videoconference interface, and the mother board.

According to a preferred embodiment of the invention, the circuit board is made of hard glass fiber or soft membrane.

According to a preferred embodiment of the invention, wherein the WLAN comprises an antenna and a high frequency communicating unit, the antenna is used for receiving wireless signals, and the high frequency is electrically connected to the antenna.

According to a preferred embodiment of the invention, a band of the high frequency communicating unit is located between 2.4 GHz and 2.5 GHz.

According to a preferred embodiment of the invention, the high frequency communicating unit is Wireless Fidelity (WIFI), Bluetooth or GPS unit.

According to a preferred embodiment of the invention, wherein the videoconference comprises an image-reading unit and a signal-processing unit, the image-reading unit is configured for reading image signals, and the signal-processing unit is electrically connected to the image-reading unit, the signal-processing unit is configured for processing the image signals outputted form the image-reading unit.

According to a preferred embodiment of the invention, wherein the image-reading unit is charge-coupled device (CCD).

According to a preferred embodiment of the invention, wherein the image-reading unit is complementary metal-oxide semiconductor (COMS) sensor.

According to a preferred embodiment of the invention, wherein the signal-processing unit is an analog to digital converting circuit or the signal-processing unit comprises an analog to digital converting circuit and a signal-amplifying circuit.

According to a preferred embodiment of the invention, wherein the transmitting interface is a connector comprising a plurality of conductive terminals or a connecter with USB interface.

According to a preferred embodiment of the invention, wherein the transmitting interface comprises a first transmitting interface and a second transmitting interface, the first transmitting interface is electrically connected to the signal-processing unit, the second transmitting interface is electrically connected to the high frequency transmitting unit, the first transmitting interface and the second transmitting interface are electrically connected to the mother board, respectively.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
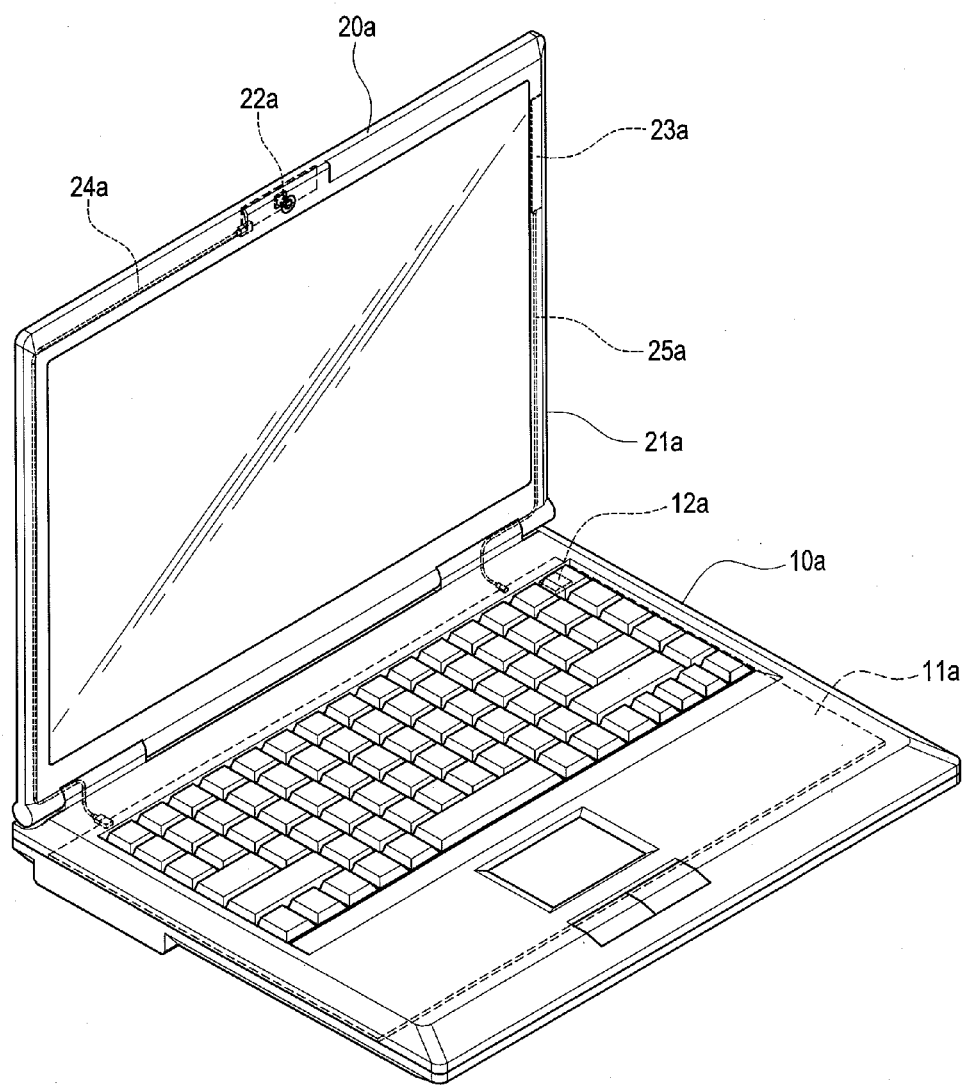
FIG. 1 is a perspective view of a conventional laptop.
Figure 2:
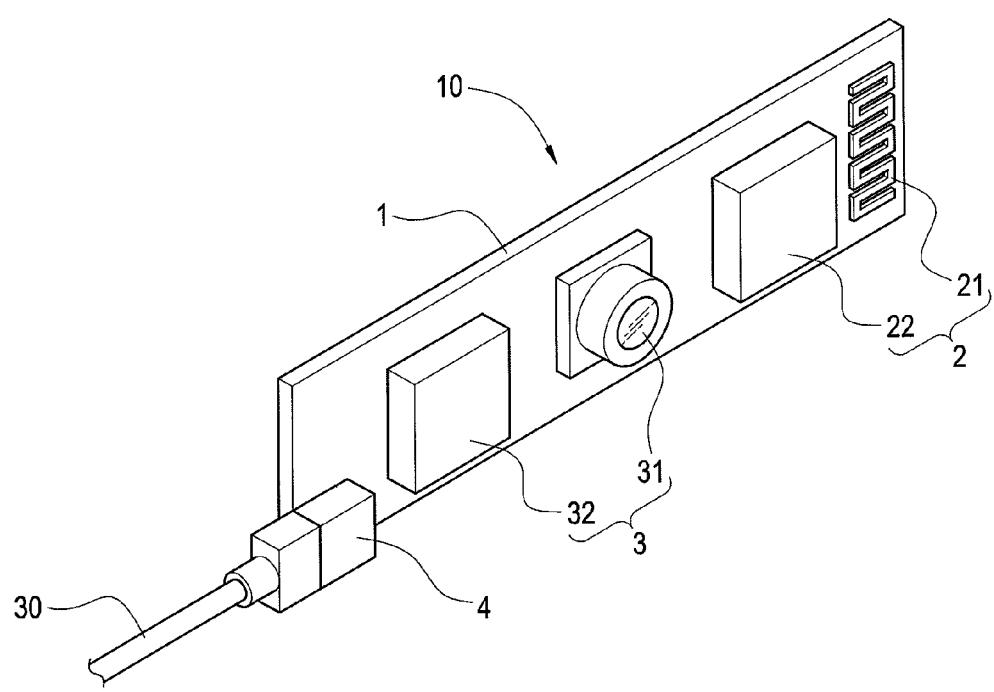
FIG. 2 is a perspective view of an integrated module for wireless network and videoconference according to a first embodiment of the present invention.
Figure 3:
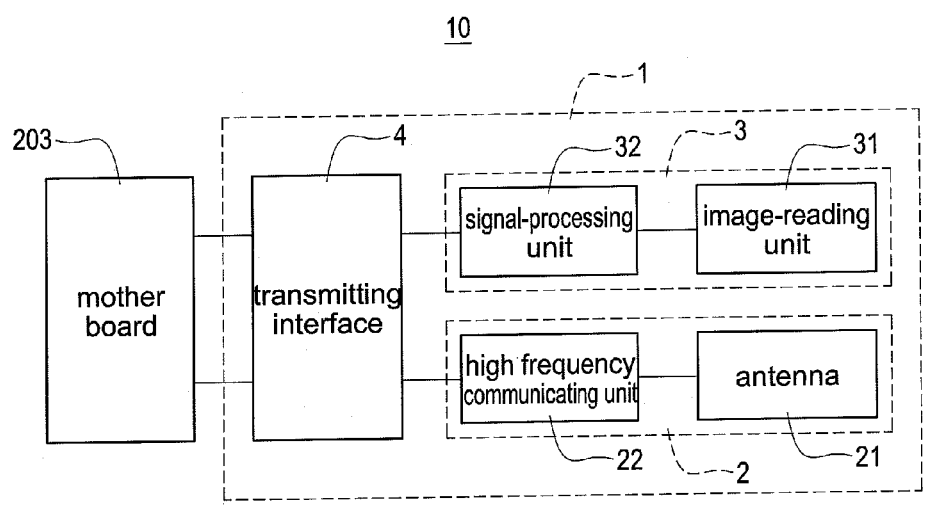
FIG. 3 is a circuit diagram of the integrated module for wireless network and videoconference shown in FIG. 2.

Reference is made to FIG. 2 and FIG. 3, FIG. 2 is a perspective view of an integrated module for wireless network and videoconference according to the present invention, and FIG. 3 is a circuit diagram of the integrated module for wireless network and videoconference shown in FIG. 2. The integrated module for wireless network and videoconference 10 includes a circuit board 1, a wireless local area network (WLAN) interface 2, a videoconference interface 3 and a transmitting interface 4.

The circuit board 1 is made of hard glass fiber or soft glass fiber. The circuit board 1 is collocated on a mother board 203 of an electronic apparatus (not shown).

The WLAN interface 2 is placed on the circuit board and electrically connected thereto. The WLAN interface 2 includes an antenna 21 and a high frequency communicating unit 22. The antenna 21 is printed on the circuit board 1 when patterns of the circuit board 1 are printed thereon. The high frequency communicating unit 22 is electrically connected to the antenna 21. The antenna 21 receives signals and then transmits the signals to the high frequency communicating unit 22. The high frequency communicating unit 22 processes the signals and transmits the processed signals to the mother board 203. The high frequency communicating unit 22 also processes the signals emitted from the mother board 206 and transmits the processed signals to the antenna 21. The antenna 21 emits the processed signals. In the present invention, the high frequency communicating unit 22 is Wireless Fidelity (WIFI), Bluetooth, or Global Positioning System (GPS) unit, and the band of the high frequency communicating unit 22 is located between 2.4 GHz and 2.5 GHz.

The videoconference unit 3 is placed on the circuit board 1 and electrically connected thereto. The video conference unit 3 includes an image-reading unit 31 and a signal-processing unit 32. The image-reading unit 31 is charge-coupled device (CCD) or complementary metal-oxide semiconductor (CMOS) sensor. The signal-processing unit 32 is electrically connected to the image-reading unit 31. The signal-processing unit 32 is used for transferring signals with analog form (outputted from the image-reading unit 31) into digital form and outputs the signals with digital form. However, the signal-processing unit 32 may also amplify the signals with digital form and outputs the amplified signals with digital form. The signal-processing unit 32 is analog to digital (A/D) converting circuit with amplifying circuit or without amplifying circuit.

The transmitting interface 4 is placed on the circuit board 1 are electrically connected thereto. The transmitting interface 4 is electrically connected to the WLAN interface 2 and the videoconference interface 3. The transmitting interface 4 is electrically connected to a bus (not shown), and the bus is electrically connected to the mother board 203, such that signals processed by the high frequency communicating unit 22 or the signal-processing unit 32 can be transmitted to the mother board 203, and signals processed by the mother board 203 can be transmitted to the circuit board 1, and then transmitted to the high frequency communicating unit 22 or the signal-processing unit 23. In this embodiment, the transmitting interface 4 is a connector includes a plurality of conductive terminal or a connector with universal serial bus (USB) interface.

Figure 4:
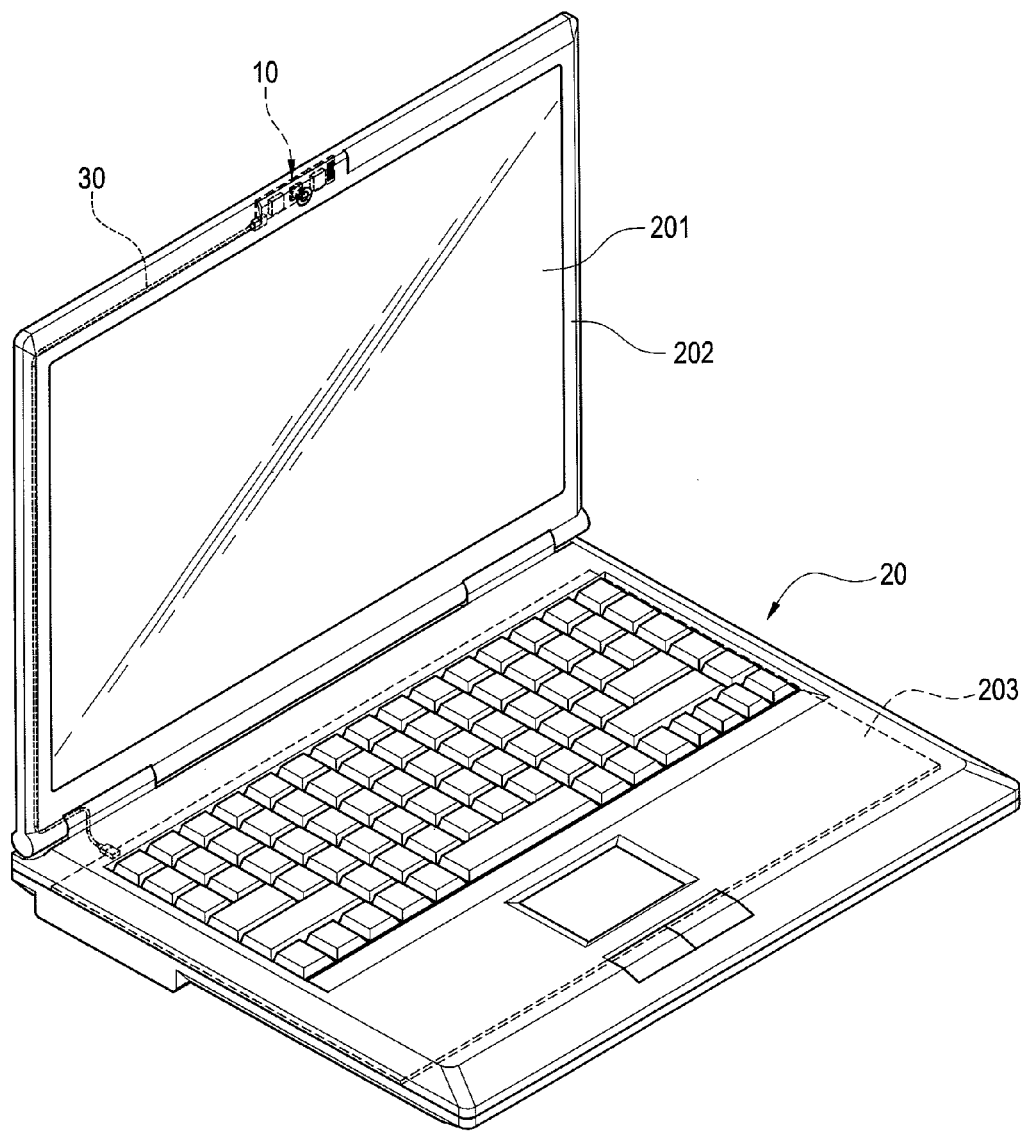
FIG. 4 is an assembly view of the integrated module for wireless network and videoconference and a laptop.

Referenced is made to FIG. 4, which is a perspective view showing assembled laptop and integrated module for wireless network and videoconference. The integrated module for wireless network and videoconference 10 is assembled within an upper frame 202 of the display 201. The transmitting interface 4 disposed on the circuit board 1 is connected to a cable 30 electrically connected to the mother board 203 of the laptop 20 by one end. Images are read by the image-reading unit 31 of the videoconference interface 3 and then transmitted image signals corresponding to the images to the signal-processing unit 32. After that, the image signals are transmitted to the mother board 203 via the transmitting interface 4, such that the image signals can be shown on the display 201. However, the image signals transmitted to the mother board 203 can also be transmitted back to the circuit board 1, processed by the high frequency communicating unit 22 of the WLAN interface 2, and then transmitted to internet via the antenna 21. A remote laptop or desk-top computer receives the image signals and then the images read by the image-reading unit can be shown.

The antenna 21 of the WLAN interface 2 receives signals form internet, the signals is processed by the high frequency communicating unit 22, and then transmitted to the mother board 203 via the bus 30 and through the transmitting interface 6. The mother board 203 processes the signals and shows the processed signals on the display 201 of the laptop 20.

Therefore, the high frequency communicating unit 22 or the signal-processing unit 32 do not need to place on the mother board 203 of the laptop 20, and the antenna 21 does not need to be assembled within the frame 202 of the display, either. In this way, the bus or conductive wire for electrically connecting the antenna 21 and videoconference lens 22 to the mother board 203 can be simplified.

Figure 5:
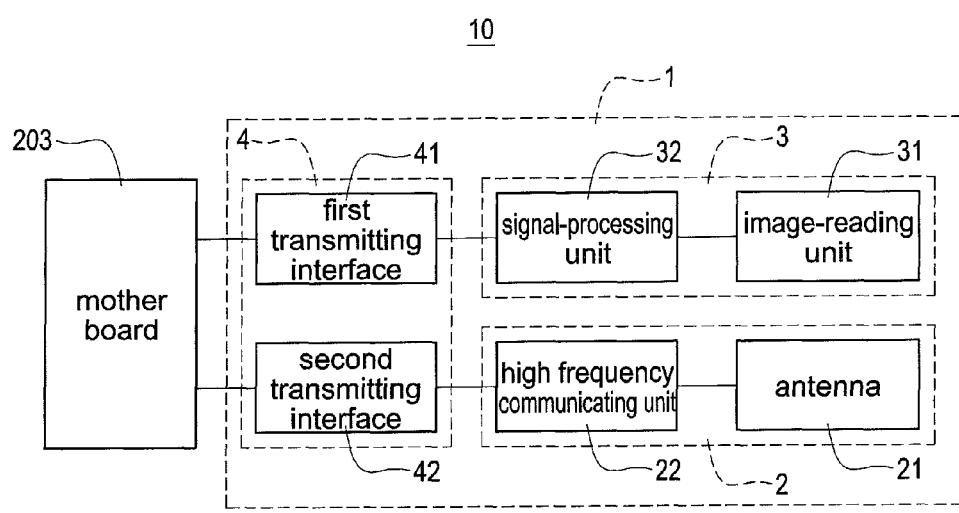
FIG. 5 is a circuit diagram of the integrated module for wireless network and videoconference according to a second embodiment of the present invention.

Reference is made to FIG. 5, which is a circuit diagram of an integrated module for wireless network and videoconference according to a second embodiment of the present invention. The transmitting interface 4 includes a first transmitting interface 41 and a second transmitting interface 42. The first transmitting interface 41 is electrically connected to the signal-processing unit 32 of the videoconference interface 3, the second transmitting interface 42 is electrically connected to the high frequency communicating unit 22 of the WLAN interface 2, and the first transmitting interface 41 and the second transmitting interface 42 is electrically connected to the mother board 203, such that signals can be transmitted by different transmitting interfaces (namely, first transmitting interface and second transmitting interface). In this embodiment, the first transmitting interface 41 and the second transmitting interface 42 are respectively a connector with a plurality of conductive terminal or a connector with USB interface.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An integrated module for wireless network and videoconference, the integrated module disposed on a laptop and electrically connecter to the laptop, the integrated module comprising:
   a circuit board;
   a wireless local area network (WLAN) interface placed on the circuit board and electrically connected thereto;
   a videoconference interface placed on the circuit and electrically connected thereto; and
   at least one transmitting interface electrically connecter to the WLAN, the videoconference interface, and the mother board,
   wherein the videoconference interface comprises:
      an image-reading unit configured for reading image signals; and
      signal-processing unit electrically connected to the image-reading unit, the signal-process unit configured for processing signals outputted form the image-reading unit.

2. The integrated module for wireless network and videoconference in claim 1, wherein the circuit is made of hard glass fiber or soft membrane.

3. The integrated module for wireless network and videoconference in claim 2, wherein the WLAN comprises:
   an antenna used for receiving wireless signal; and
   a high frequency communicating unit electrically connected to the antenna.

4. The integrated module for wireless network and videoconference in claim 3, wherein a band of the high frequency communicating unit is located between 2.4GHz and 2.5GHz.

5. The integrated module for wireless network and videoconference in claim 4, wherein the high frequency communicating unit is Wireless Fidelity (WIFI), Bluetooth, or Global Positioning System (GPS) unit.

6. The integrated module for wireless network and videoconference in claim 1, wherein the image-reading unit is charge-coupled device (CCD).

7. The integrated module for wireless network and videoconference in claim 6, wherein the image-reading unit is complementary metal-oxide semiconductor (COMS) sensor.

8. The integrated module for wireless network and videoconference in claim 7, wherein the signal-processing unit is an analog to digital converting circuit or the signal-processing unit comprises an analog to digital converting circuit and a signal-amplifying circuit.

9. The integrated module for wireless network and videoconference in claim 8, wherein the transmitting interface is a connector comprising a plurality of conductive terminal or the transmitting interface is a connecter with USB interface.

10. The integrated module for wireless network and videoconference in claim 9, wherein the transmitting interface comprises a first transmitting interface and a second transmitting interface, the first transmitting interface is electrically connected to the signal-processing unit, the second transmitting interface is electrically connected to the high frequency transmitting unit, the first transmitting interface and the second transmitting interface are electrically connected to the mother board, respectively.

* * * * *